July 7, 1931. J. H. STOCKHOLDER 1,813,687
LIQUID PURIFYING DEVICE
Filed July 8, 1930 2 Sheets-Sheet 2
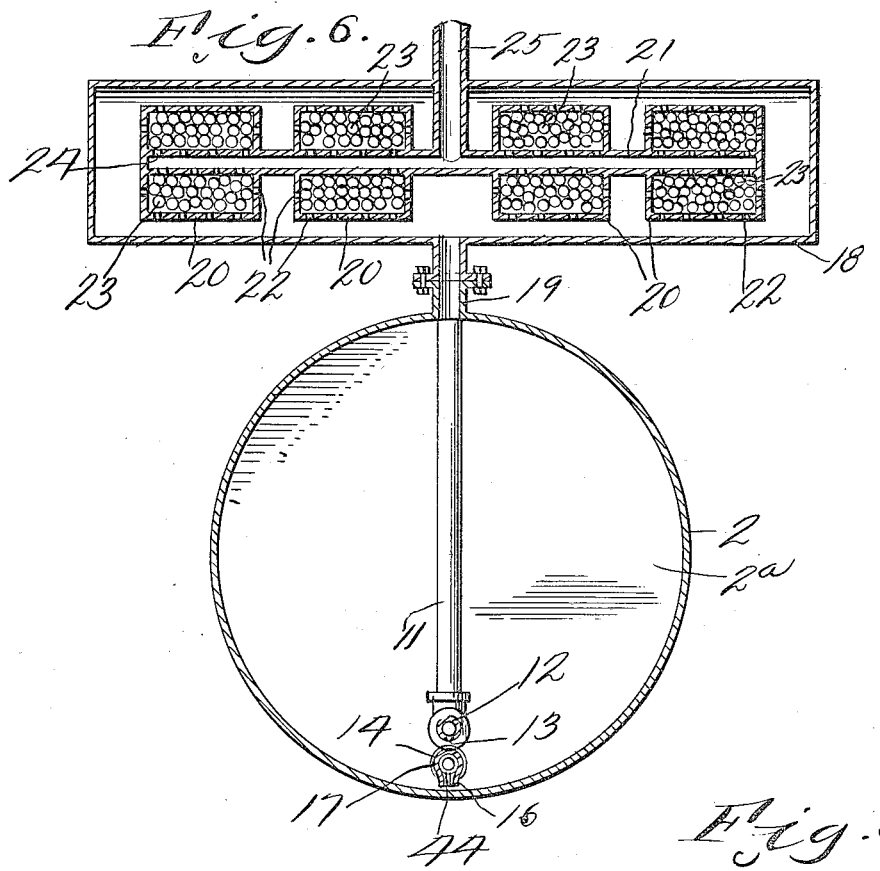
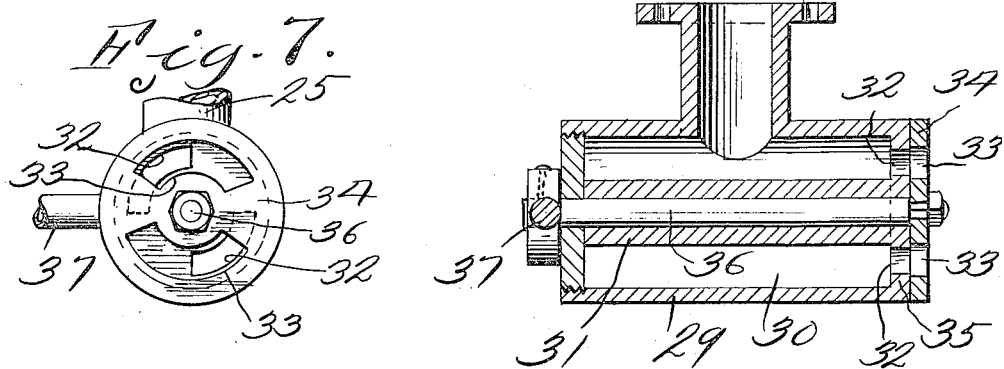
INVENTOR.
John H. Stockholder
BY
Philip A. Ffnell
ATTORNEY.

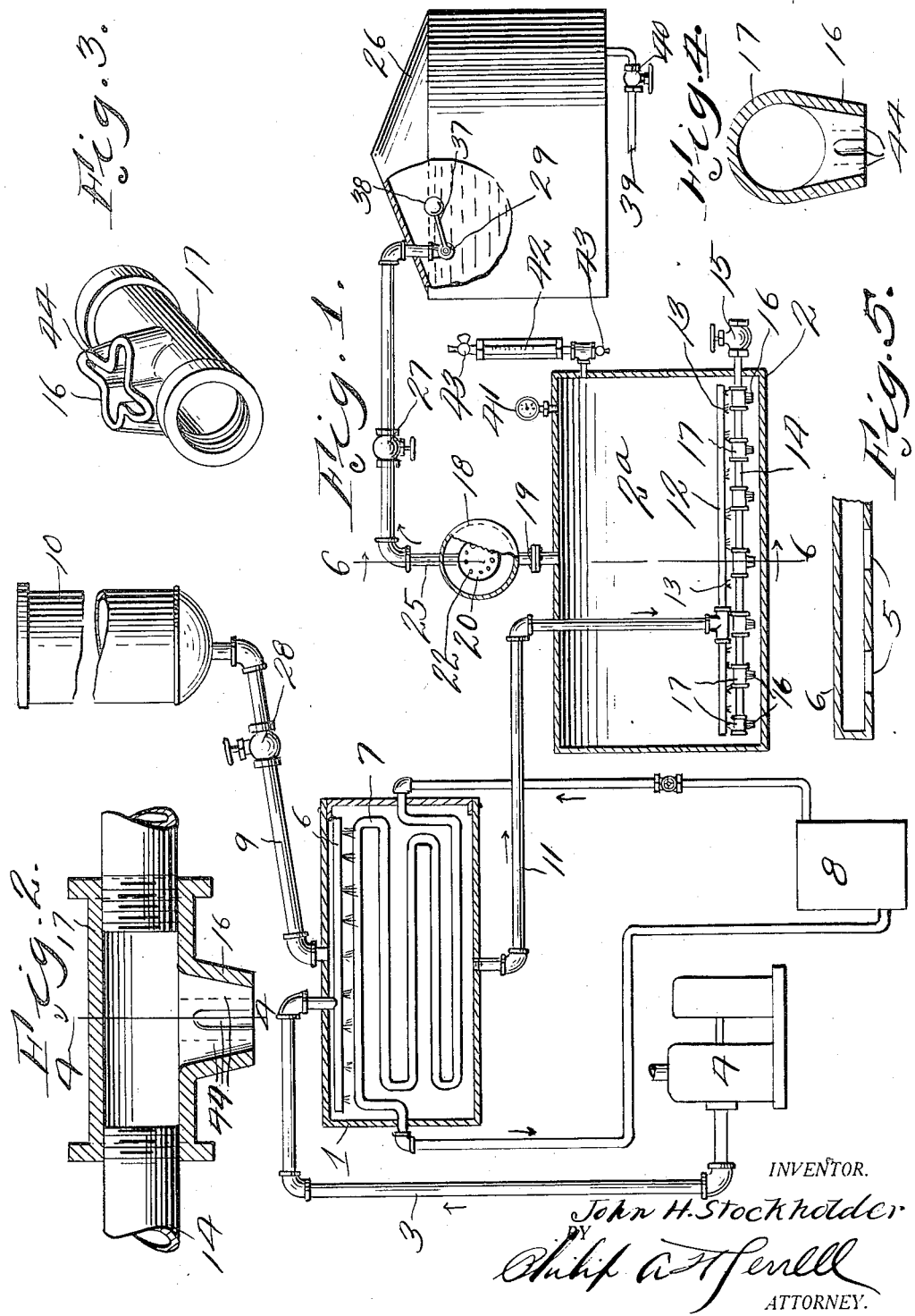

Patented July 7, 1931

1,813,687

UNITED STATES PATENT OFFICE

JOHN H. STOCKHOLDER, OF NEW ORLEANS, LOUISIANA, ASSIGNOR TO MARY STOCKHOLDER, OF NEW ORLEANS, LOUISIANA

LIQUID PURIFYING DEVICE

Application filed July 8, 1930. Serial No. 466,519.

The invention relates to liquid purifying devices, and has for its object to provide a device of this character particularly adapted for use in rural districts in the oil fields where streams are polluted with oil and other foreign matter, and to provide a device of this character which will thoroughly clean the water so it is fit for use.

A further object is to provide a water cleansing and purifying system comprising means whereby the water is forced over steam pipes within a tank for heating the water and extracting odors therefrom, which odors are discharged into the atmosphere, then discharged into a separating tank adjacent the lower end of the tank, so that sediment will settle in the bottom of the separating tank, and then discharge upwardly through a straining device, and finaly discharge into a valve controlled storage tank.

A further object is to provide a cleaning device for the separating tank comprising a pipe in the lower portion of the chamber of the separating tank and having a plurality of T-shaped fittings, one of the arms of which extends downwardly and is crimped thereby forming discharge nozzles having intake ports cross shaped, and through which sediment in the separating tank is forced into the pipe by pressure and discharged from the separation tank.

A further object is to dispose the perforated water supply pipe within the separation tank above the cleaner pipe, and in a position whereby water will be discharged downwardly onto the cleaner pipe for collecting the sediment adjacent the cleaner pipe for increasing the efficiency of the cleaner.

With the above and other objects in view the invention resides in the combination and arrangement of parts as hereinafter set forth, shown in the drawings, described and claimed, it being understood that changes in the precise embodiment of the invention may be made within the scope of what is claimed without departing from the invention.

In the drawings:—

Figure 1 is a vertical longitudinal sectional view through the apparatus, part being shown in elevation to better show the structure.

Figure 2 is a vertical longitudinal sectional view through one of the separation tank cleaner fittings.

Figure 3 is a perspective view of one of the cleaner fittings.

Figure 4 is a vertical transverse sectional view taken on line 4—4 of Figure 2.

Figure 5 is a vertical longitudinal sectional view through one end of one of the spraying pipes.

Figure 6 is a vertical transverse sectional view taken on line 6—6 of Figure 1.

Figure 7 is a view in elevation of the discharge end of the storage tank valve.

Figure 8 is a vertical longitudinal sectional view through the storage tank valve.

Referring to the drawings, the numeral 1 designates the cracking tank and 2 the separating tank. The liquid from any suitable source of supply is forced into the cracking tank through the water supply pipe 3 by the pump 4, thence discharged downwardly through the ports 5 of the pipe 6 in the upper portion of the chamber of the cracking tank. Disposed within the cracking tank is a loop heater 7, through which steam is forced from a liquid heater and vaporizer 8, therefore it will be seen that as the water in its polluted condition passes over the heater 7, the odors therefrom will pass upwardly through the discharge pipe 9 to the discharge head 10 which is adapted to be placed a substantial distance in the air on any suitable structure. After the odors are separated by the heating member 7 in the cracking tank 1, the water then passes through the pipe 11, which extends downwardly into the separating tank 2 and terminates in a horizontally disposed spray pipe 12 having its ports 13 downwardly disposed and in positions where the liquid will be discharged onto the cleaner pipe 14.

Cleaner pipe 14 is disposed in the bottom of the chamber 2a of the separating tank 2, so that sediment in the separating tank chamber bottom may be easily and quickly removed by pressure within the tank when the cleaner pipe valve 15 is opened. By disposing the spray pipe 12, above and adjacent the cleaner pipe 14, it is obvious that the bulk of the sediment will be deposited around the discharge nozzle 16 of the T-shaped fitting 17 of the cleaner pipe where liquid pressure applied within the separating tank will force the sediment through the discharge nozzle 16 and cleaner pipe 14. Disposed above the separator tank 2 is a strainer drum 18 connected to the tank 2 by means of a pipe 19 and through which pipe the cleaned and purified liquid passes for a further straining operation in the perforated strainer drums 20 carried by the horizontal pipe 21. It will be noted that the drums 20 are provided with perforations 22, through which all of the liquid would have to pass into engagement with the strainer marbles 23 before entering the pipe 21 through the perforations 24, therefore it will be seen that all of the liquid will be thoroughly strained before passing upwardly through the pipe 25 to the storage tank 26. During the sediment cleaning operation through the pipe 14 under pressure, the valve 27 carried by the pipe 25 is closed as well as the valve 28 carried by the pipe 9, therefore it will be seen that the pump 4 may be utilized for supplying maximum pressure within the separating tank 2 for the cleaning operation.

Disposed within the storage tank 26 is a float control valve comprising a casing 29 connected to the pipe 25, and which casing has a chamber 30 around a stationary sleeve 31 into which the cleansed and purified water passes. Casing 29, at one of its ends, is provided with discharge ports 32 through which the liquid passes, and which liquid then passes into the tank 26 through the ports 33 in the disc valve 34. Disc valve 34 seats against the outer side of the end wall 35 of the valve casing and is rotated by means of the shaft 36 rotatably mounted in the sleeve 31. Secured on one end of shaft 36 is the arm 37 of the float 38, therefore it will be seen that when the water within the storage tank 26 reaches a predetermined level, disc valve 34 will be moved to closed position, thereby cutting off further supply of liquid to the tank until the liquid level therein is lowered by use of water through the discharge pipe 39, which is controlled by a valve 40. Separation tank 2 is preferably provided with a pressure gage 41 and a liquid gage and testing device 42 whereby the level of liquid in the tank 2 may be gaged and samples of liquid removed through either valve 43 for testing the purity thereof.

In forming the nozzle 16 commercial T fittings are used, however the end of one of the arms is removed, then said arm is crimped or twisted to form the trough shaped intake ports 44 shown in Figure 3. By the twisting and crimping operation the nozzles can be cheaply manufactured and provided with intake ports which give a maximum efficiency, as well as allow the use of standard material, reducing the cost of manufacture to a minimum.

From the above it will be seen that a liquid purifying and cleaning device is provided, which is simple in construction, the parts reduced to a minimum and one wherein the liquid is reduced to a cracking operation for separating the odors therefrom and then to a settling operation for separating foreign matter before passing through a final straining operation. It will also be seen that a simple cleaner discharge nozzle is provided for the cleaner pipe, thereby increasing the efficiency of the device and allowing the cleaner element to be cheaply manufactured.

The invention having been set forth what is claimed as new and useful is:—

1. A water cleaning and purifying apparatus comprising a cracking tank, a separating tank, a storage tank, a heating element in the cracking tank, a spraying device in the cracking tank above the heating element, means for forcing liquid through said spraying element onto the heating element, means for discharging odor from the cracking tank, a spraying device in the bottom of the chamber of the separating tank, means for discharging liquid from the cracking tank into the separating tank through the spraying device, means for discharging liquid from the upper end of the separating tank into the storage tank and strainer means interposed between the separating tank and storage tank and through which liquid passing to the storage tank passes.

2. A water cleaning and purifying apparatus comprising a cracking tank, means for supplying heat within the cracking tank, means for discharging water downwardly into the cracking tank into engagement with the heating means, a separating tank, means for discharging water from the cracking tank downwardly into the sediment tank adjacent the bottom thereof, a storage tank, a strainer between the storage tank and separating tank and means for discharging water upwardly from the separating tank into the storage tank through the strainer.

3. A water cleaning and purifying device comprising a cracking tank, a sediment tank, a storage tank, a horizontally disposed perforated spraying pipe in the bottom of the sediment tank and discharging downwardly, means for discharging water into said perforated spraying pipe, a cleaner pipe beneath the spraying pipe and a plurality of downwardly extending discharge nozzles carried by the cleaner pipe.

4. The combination with a liquid purifying separation tank having a spray pipe in the lower portion thereof and projecting liquid downwardly, of a clean out pipe beneath said spray pipe, said clean out pipe having a plurality of T-shaped fittings, one of the arms of said T-shaped fittings extending downwardly, said last named arm having its opposite sides crimped inwardly thereby forming a port having a plurality of vanes.

5. A water cleaning and purifying apparatus comprising a cracking tank, a separating tank, a storage tank, a heating element in the cracking tank, a spraying device in the cracking tank discharging on the heating element, means for forcing liquid through said spraying element onto the heating element, means for discharging odor from the cracking tank, a spraying device in the chamber of the separating tank, means for discharging liquid from the cracking tank into the separating tank through the spraying device, means for discharging liquid from the separating tank into the storage tank and strainer means interposed between the separating tank and storage tank and through which liquid passing to the storage tank passes.

In testimony whereof he hereunto affixes his signature.

JOHN H. STOCKHOLDER.